No. 611,778. Patented Oct. 4, 1898.
J. B. ENTZ.
ELECTRIC RAILWAY.
(Application filed Dec. 21, 1895.)

(No Model.) 2 Sheets—Sheet 1.

Witnesses:
H. J. Jackson.
K. M. Gilligan.

Inventor
Justus B. Entz
By Augustus B. Stoughton
Attorney

No. 611,778. Patented Oct. 4, 1898.
J. B. ENTZ.
ELECTRIC RAILWAY.
(Application filed Dec. 21, 1895.)
(No Model.) 2 Sheets—Sheet 2.
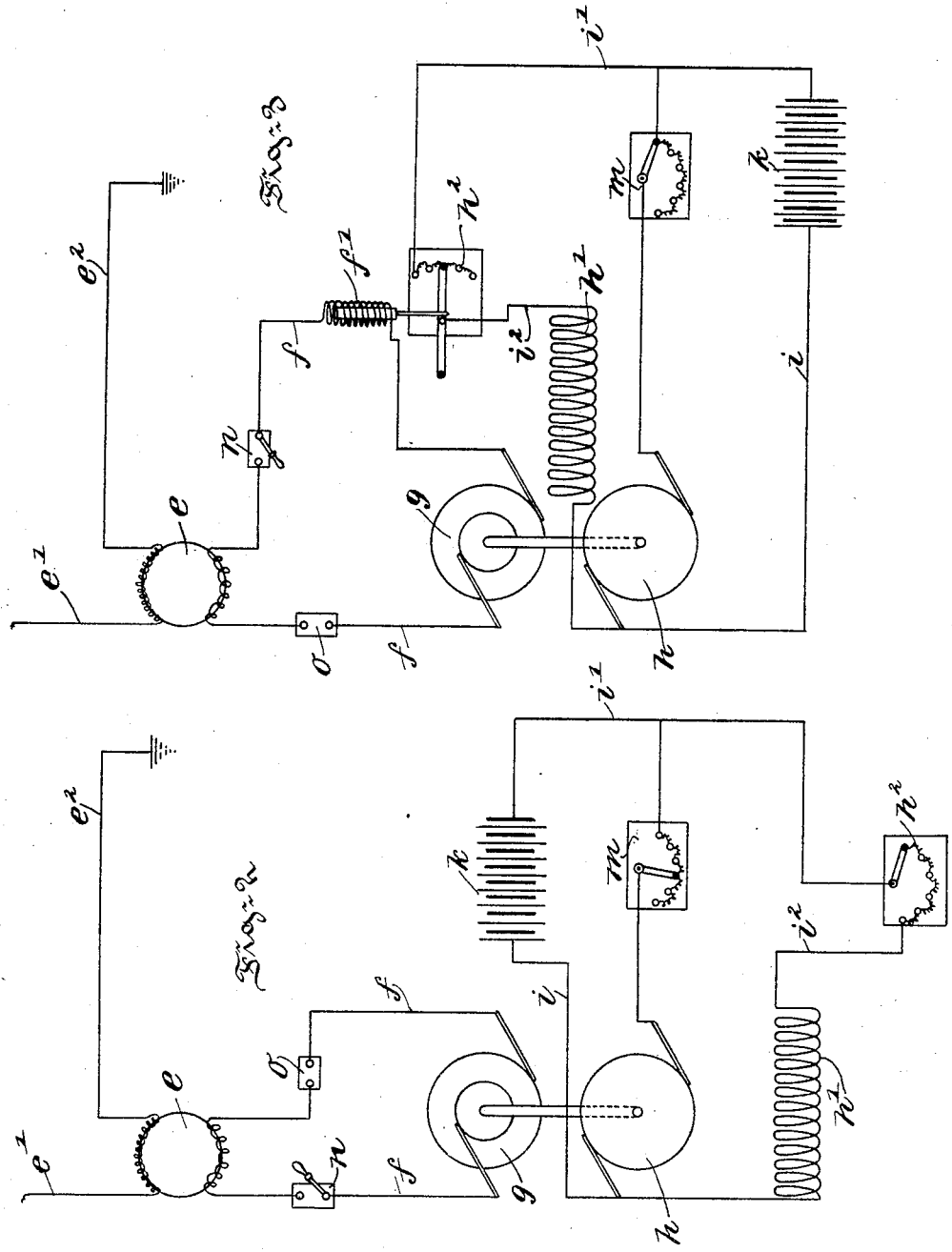

UNITED STATES PATENT OFFICE.

JUSTUS BULKLEY ENTZ, OF PHILADELPHIA, PENNSYLVANIA.

ELECTRIC RAILWAY.

SPECIFICATION forming part of Letters Patent No. 611,778, dated October 4, 1898.

Application filed December 21, 1895. Serial No. 572,912. (No model.)

*To all whom it may concern:*

Be it known that I, JUSTUS BULKLEY ENTZ, a citizen of the United States, residing at the city of Philadelphia, in the county of Philadelphia and State of Pennsylvania, have invented certain new and useful Improvements in Electrical Distribution, of which the following is a specification.

My invention relates to the operation of railways by means of alternating currents.

One object of my invention is to guard against interruption of traffic and to provide for starting the alternating-current portions of the apparatus and for insuring the operation of the same under conditions of constant load and maximum efficiency.

Another object of my invention is to reduce the cost of installation and decrease the operating expenses of an electric railway.

Another object of my invention is to provide for crossings or intersections of the line without giving rise to the necessity for the employment of complicated switches or electrical fittings.

My invention consists of the improvements hereinafter described and claimed.

The nature, characteristic features, and scope of my invention will be more fully understood from the following description, taken in connection with the accompanying drawings, forming part hereof, and in which—

Figure 3:
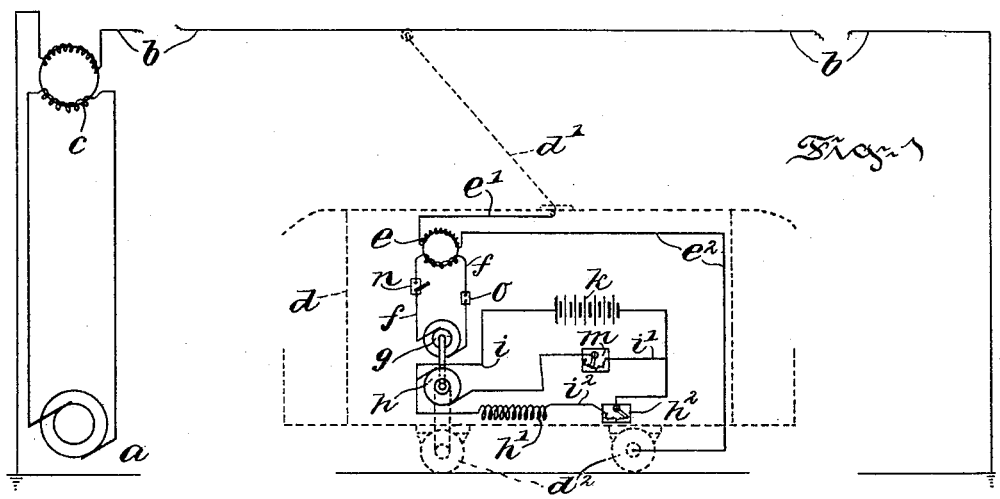
Figure 4:
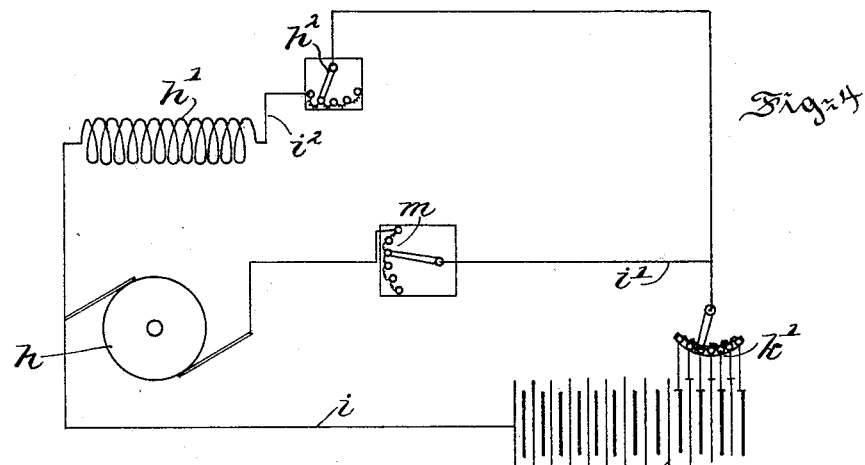
Figures 5, 6, 7:
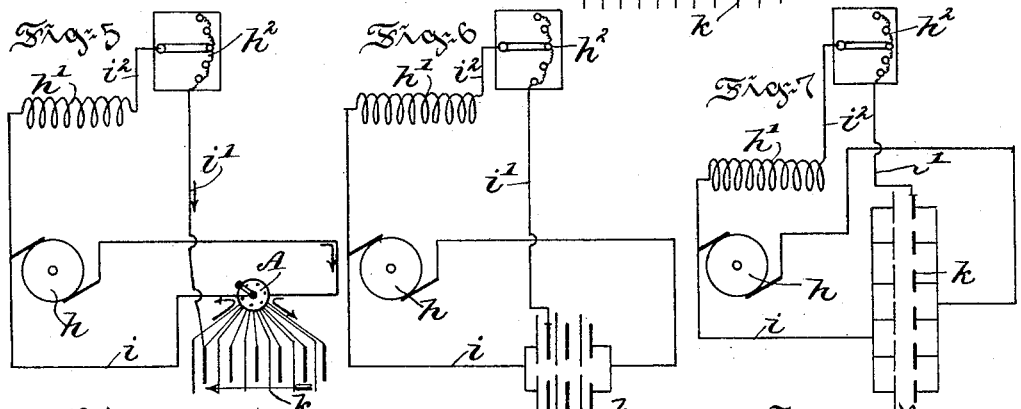

Figure 1 is a diagrammatic view illustrating a power-station generating alternating currents of electricity, line or working conductors, a motor-car or locomotive taking current from the line or working conductors and normally driven by an alternating-current motor and provided with a constant-current dynamo or winding, and a storage battery which may drive the constant-current dynamo as a motor or receive current from it when driven either by the alternating-current motor or by the momentum of the motor-car or locomotive. Fig. 2 is a similar view illustrating upon a larger scale the circuits of the car or locomotive shown in Fig. 1 and showing a hand-controlled rheostat for varying the field of the constant-current dynamo or winding to cause it to charge or receive current from the storage battery. Fig. 3 is a similar view illustrating a modification of my invention in which the field of the constant-current dynamo or winding is increased or diminished through the intervention of resistance devices automatically responding to changes of currents in the alternating circuit. Fig. 4 is a similar view showing an end-cell switch for increasing or diminishing the electromotive force of the storage battery to cause it to give or take current from the constant-current dynamo or winding; and Figs. 5, 6, and 7 are similar views illustrating the employment of different series parallel combinations for controlling the electromotive force of the storage battery, for example, in starting.

In the drawings, $a$ is a power-station generating alternating currents for supplying the line or working conductor $b$. For the sake of illustration I have shown a converter $c$, that may be employed for increasing the voltage from the power-station to the line or working conductor, whereby the latter may be made of comparatively small weight and cost.

$d$ is a motor-car or locomotive taking alternating current from the line—for example, by conductors $d'$ and $d^2$—which may comprise a trolley-pole, plow, or the like, and a brush, trolley-pole, or vehicle-wheel. In the drawings I have shown a step-down converter $e$ for reducing the voltage in the alternating-current car-circuit $f$ lower than the voltage of the line and of the conductors $d'$, $e'$, $e^2$, and $d^2$. The motor-car or locomotive $d$ is provided with an electric machine similar to a rotary transformer having an alternating end $g$ interposed in the car-circuit $f$ and having a constant or direct current end $h$. Obviously such a rotary transformer may comprise a dynamo-machine having a ring-collector for the alternating-current end and a segmental commutator for the constant-current end, or an alternating motor provided with a constant-current winding, or the alternating motor $g$ and constant-current winding $h$ may be otherwise mechanically connected—for example, by attaching them to a shaft or to one or both of the axles. The constant-current end or source $h$ and its field $h'$, which may also be the field of the alternating-current winding, are connected by the constant-current car-circuit $i$ $i'$ $i^2$ with a storage battery $k$, carried on the car or locomotive and adapted to receive a charge from the constant-current end or source $h$ when the power required to drive the car or locomotive is less than normal and to drive the constant-current end $h$ when the load of the car or locomotive is more than normal, and so help out the alternating-current end or motor $g$, which normally drives the car or locomotive. This battery $k$ is also adapted to drive the train, car, or locomotive by means of the constant-current end $h$ for a considerable time without the aid of the alternating-current motor or end $g$, for example, in starting up to speed or to carry the car, train, or locomotive past places where it is difficult to secure contact with the line. Either manual or automatic means are provided for regulating the electromotive force of the battery in respect to that of the constant end $h$, so as to cause it to receive or give current to the constant-current end or winding. Referring to Figs. 1, 2, and 3, this result is accomplished by varying the field $h'$ by means of a resistance-switch $h^2$. In Fig. 4 it is accomplished by means of an end-cell switch $k'$. Obviously these switches $h^2$ and $k'$ may be operated by hand or they may be operated automatically, for example, by the devices illustrated in Fig. 3, in which $f'$ is a solenoid having its core connected with the pivotal handle of the switch, so that the core shifts the switch in response to changes of current in the alternating-current car-circuit $f$. Clearly the solenoid $f'$ and its accessories (shown in Fig. 3) may be readily connected with and availed of for operating the switch $k'$ of Fig. 4. It has been stated that the constant-current end or winding $h$ and the storage battery $k$ may be availed of for starting the motor-car or locomotive. For this purpose means must be provided for controlling the battery. In Figs. 1, 2, 3, and 4 this result is accomplished by means of a starting resistance or rheostat $m$, interposed between the battery and the brushes of the constant-current end or winding. However, this result may be accomplished by grouping the cells of the battery in different series parallel relation, as shown in Figs. 5, 6, and 7, for the purpose of controlling the electromotive force of the battery. For this purpose use is made of any preferred or known type of series parallel controller, (indicated at A, Fig. 5, and omitted from Figs. 6 and 7 for the sake of clearness in the drawings.)

$n$ is a cut-out or switch that may be employed for interrupting the alternating-current car-circuit $f$, and $o$ is an ampere-meter interposed in said alternating-current car-circuit.

The mode of operation of my invention may be described as follows: Normally the motor-car or locomotive is propelled by the alternating-current motor or end $g$, which derives current from the power-station $a$ by way of the line conductor $b$, and of a suitable return, which may be the rails, the earth, or an additional conductor or conductors. In the event of the occurrence of a decrease of load upon the motor-car or locomotive—such, for example, as would occur when the same is proceeding downhill or is being brought to rest—there is a tendency for the current in the alternating circuit to decrease. However, such tendency is opposed by causing the constant-current end or winding $h$ to charge the storage battery $k$, and this result is effected manually by means of switches $k'$ or $h^2$, which are operated by the attendant in charge with reference to the ampere-meter $o$. In cases where the solenoid $f'$ is employed it responds automatically to changes in its alternating circuit and effects the required movements of the switches. In the event of the occurrence of an increase of load upon the motor-car or locomotive there is a tendency toward an increase of current in the alternating circuit, and such tendency if unrestrained would overload the alternating-current motor $g$ beyond its capacity. However, such tendency is restrained, because the storage battery is permitted, for example, by manipulating its controlling switches, as $k'$ or $h^2$, to discharge and drive the constant-current end or winding $h$ as a motor in such manner that it coöperates with and helps out and prevents an overload of the alternating-current motor $g$.

From the foregoing it is apparent that the alternating motor $g$ takes a substantially constant current, and therefore operates at maximum efficiency, and that the constant-current end or winding $h$ helps out the alternating-current motor in case of overload and prevents an underload by doing work in charging the battery. Consequently the load on the line is substantially constant, thus insuring the maximum efficiency of the alternating-current electrical apparatus interposed therein or connected therewith. Moreover, since variations in the load are taken up or compensated for by the storage battery $k$, it follows that the alternating-current installation may be proportioned for the average instead of somewhere near the maximum load of the road or line. The locomotive or motor-car may be started by permitting the storage battery $k$ to operate upon the constant-current end or winding $h$ as a motor. For this purpose use may be made of the starting resistance $m$ or of the series parallel controller A and various groupings of the battery, (shown in Figs. 5, 6, and 7,) it being understood that in Fig. 5 the battery is in series, as indicated by the arrows. In this connection it may be remarked that the alternating-current circuit may be interrupted, for example, by means of the switch $n$. This arrangement is advantageous in cases where the alternating motor $g$ is of such a type that it will not start itself, because the battery $k$ drives the motor $g$ through the intervention of the end or winding $h$ until the motor $g$ is brought into synchronism with the rest of the alternating-current apparatus, whereupon the hand-switch n may be closed and the car or locomotive propelled by the alternating-current motor, as has been described. Moreover, the alternating motor may be cut out of line and the vehicle propelled by its storage battery and accessories, as described, for a considerable distance. This is important in cases where the alternating-current motor g is of a type that requires a number of line conductors, for example, of the three-phase type, which requires three line conductors, because it permits of the motor-car or locomotive being propelled past intersections of the line without the insertion of complicated fixtures or switches therein, such as would be necessary for keeping the three wires separate and providing for contact from the motor-car or locomotive therewith.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. In an electric railway the combination of, a rotary transformer having its alternating-current end adapted to develop the average power required for driving a motor-car or locomotive and having its direct-current end connected with a storage battery which compensates for variations from the average load, a motor-car or locomotive carrying said apparatus and having its driving-wheels mechanically connected with the rotary transformer, power-station apparatus generating alternating current and having line or working circuit connections extending along the railway, and means for supplying current from said line or working circuit to the alternating-current end of the transformer, whereby the alternating current on the line or working circuit and on the power-station apparatus is kept uniform thus permitting of the installation of the latter for the average load, substantially as described.

2. In an electric railway the combination of, a rotary transformer having its alternating-current end adapted to develop the average power required for driving a motor-car or locomotive and having its direct-current end connected with a storage battery which compensates for variations from the average load, a motor-car or locomotive carrying said apparatus and having its driving-wheels mechanically connected with the rotary transformer, power-station apparatus generating alternating current and having line or working circuit connections extending along the railway, means for supplying current from said line or working circuit to the alternating-current end of the transformer, and devices for including and excluding the rotary transformer in and from the line or working circuit, whereby the alternating current on the line or working circuit and on the power-station apparatus is kept uniform thus permitting of the installation of the latter for the average load, substantially as described.

3. In an electric railway the combination of, a rotary transformer having its alternating-current end adapted to develop the average power required for driving a motor-car or locomotive and having its direct-current end connected with a storage battery which compensates for variations from the average load, a motor-car or locomotive carrying said apparatus and having its driving-wheels mechanically connected with the rotary transformer, power-station apparatus generating alternating current and having line or working circuit connections extending along the railway, converters, means for supplying current from said line or working circuit to the alternating-current end of the transformer, and devices for including and excluding the rotary transformer in and from the line or working circuit, whereby the alternating current on the line or working circuit and on the power-station apparatus is kept uniform thus permitting of the installation of the latter for the average load, substantially as described.

4. In an electric railway the combination of, a rotary transformer having its alternating-current end adapted to develop the average power required for driving a motor-car or locomotive and having its direct-current end connected with a storage battery which compensates for variations from the average load, a motor-car or locomotive carrying said apparatus and having its driving-wheels mechanically connected with the rotary transformer, power-station apparatus generating alternating current and having line or working circuit connections extending along the railway, means for supplying current from said line or working circuit to the alternating-current end of the transformer, and apparatus for varying the electromotive force of the battery and direct-current end of the rotary transformer in respect to each other, whereby the alternating current on the line or working circuit and on the power-station apparatus is kept uniform thus permitting of the installation of the latter for the average load, substantially as described.

In testimony whereof I have hereunto signed my name.

JUSTUS BULKLEY ENTZ.

In presence of—
J. APPLETON,
R. W. RUNDLE.